United States Patent
Lee et al.

(10) Patent No.: US 9,460,345 B2
(45) Date of Patent: Oct. 4, 2016

(54) APPARATUS AND METHOD FOR RECOGNIZING MEDIA, FINANCIAL DEVICE

(71) Applicant: LG CNS Co., Ltd., Seoul (KR)

(72) Inventors: Jung In Lee, Seoul (KR); Beum Yong Koo, Seoul (KR); Eun Ki Kim, Seoul (KR); Joong Ho An, Seoul (KR); Han Cheol Cho, Seoul (KR)

(73) Assignee: LG CNS CO., LTD., Seoul (KR)

( * ) Notice: Subject to any disclaimer, the term of this patent is extended or adjusted under 35 U.S.C. 154(b) by 0 days.

(21) Appl. No.: 14/753,624

(22) Filed: Jun. 29, 2015

(65) Prior Publication Data
US 2015/0379337 A1 Dec. 31, 2015

(30) Foreign Application Priority Data

Jun. 30, 2014 (KR) .................. 10-2014-0081359

(51) Int. Cl.
*G07D 7/12* (2016.01)
*G06K 9/00* (2006.01)
(Continued)

(52) U.S. Cl.
CPC ......... *G06K 9/00442* (2013.01); *G06K 9/2018* (2013.01); *G06K 9/54* (2013.01); *G06K 9/6202* (2013.01); *G06T 7/003* (2013.01); *G06T 7/0083* (2013.01); *G07D 7/0033* (2013.01); *G07D 7/12* (2013.01); *G07D 7/122* (2013.01); *G07D 7/2008* (2013.01); *G07D 7/2016* (2013.01);
(Continued)

(58) Field of Classification Search
CPC .......... G06K 9/00442; G06K 9/2018; G06K 9/6202; G06K 9/78; G06T 7/0002; G06T 7/003; G07D 7/12; G07D 7/122

USPC ....... 194/207, 302; 250/556, 559.05, 559.11; 382/112, 135, 177, 182
See application file for complete search history.

(56) References Cited

U.S. PATENT DOCUMENTS 3,764,978 A 10/1973 Tyburski et al.
6,040,584 A * 3/2000 Liu ..................... G01N 21/88
194/207

(Continued)

FOREIGN PATENT DOCUMENTS

GB 2398914 A 9/2004
JP H10154256 A 6/1998
(Continued)

OTHER PUBLICATIONS

Notice of Allowance dated Apr. 21, 2016 in Korean Application No. 10-2014-0081359, (2 pages).
(Continued)

*Primary Examiner* — Mark Beauchaine
(74) *Attorney, Agent, or Firm* — Saliwanchik, Lloyd & Eisenschenk

(57) ABSTRACT

The present disclosure relates to an apparatus and a method for recognizing media and a financial device. The apparatus for recognizing media according to an exemplary embodiment of the present disclosure includes: an image sensor configured to emit different first light source and second light source to media including at least one character to acquire a first image and a second image corresponding to each light source; a noise detector configured to detect noise of a region in which the character is included from the first image and the second image; and a controller configured to combine the first image and the second image depending on the detected noise information to recognize the character included in the media.

11 Claims, 8 Drawing Sheets

(51) Int. Cl.
  *G06K 9/20* (2006.01)
  *G06K 9/54* (2006.01)
  *G06K 9/62* (2006.01)
  *G06T 7/00* (2006.01)
  *G07D 7/00* (2016.01)
  *G07D 7/20* (2016.01)
  *G06K 17/00* (2006.01)

(52) U.S. Cl.
  CPC .......... *G06K2017/0064* (2013.01); *G06T 2207/10004* (2013.01); *G06T 2207/10048* (2013.01); *G06T 2207/30176* (2013.01)

(56) References Cited

U.S. PATENT DOCUMENTS

2004/0169846 A1   9/2004   Ross
2004/0240722 A1   12/2004  Tsuji et al.
2010/0258629 A1   10/2010  Huang
2011/0164805 A1   7/2011   Blair et al.

FOREIGN PATENT DOCUMENTS

| JP | 2010225013 A | 10/2010 |
| KR | 2004-0104379 A | 12/2004 |
| KR | 20140007764 A | 1/2014 |
| KR | 2014-0019507 A | 2/2014 |

OTHER PUBLICATIONS

European Search Report dated Oct. 12, 2015 in European Application No. 15174489.3, (6 pages).
Office Action dated Jan. 21, 2016 in Korean Application No. 10-2014-0081359, (4 pages).

* cited by examiner

|     | INFRARED IMAGE | VISIBLE LIGHT IMAGE | CHARACTER RECOGNITION RESULT |
| --- | --- | --- | --- |
| (a) | NORMAL RECOGNITION | NORMAL RECOGNITION | RECOGNITION |
| (b) | NORMAL RECOGNITION | NOISE | RECOGNITION |
| (c) | NOISE | NORMAL RECOGNITION | RECOGNITION |
| (d) | NOISE | NOISE | RECOGNITION / NON-RECOGNITION |

FIG. 3

|     |     |     |
| --- | --- | --- |
| (a) | 19649549 | → 1 9 6 4 9 5 4 9 |
| (b) | 19649549 | → 1 9 6 4 9 5 4 9 |
| (c) | 1 9 6 4 9 5 4 9 |  |

FIG. 4

| | | |
|---|---|---|
| (a) | 19649549 | → 1 9 6 4 9 5 4 9 |
| (b) | 1964▮549 | → 1 9 6 4 [x] 5 4 9 |
| (c) | 1 9 6 4 [9] 5 4 9 | 520 |

| | | |
|---|---|---|
| (a) | 19649549 | → 1 9 6 4 9 5 4 9 |
| (b) | ▆▆▆▆▆▆ | → [x x x x x x x x] |
| (c) | 1 9 6 4 9 5 4 9 | 610  620 |

APPARATUS AND METHOD FOR RECOGNIZING MEDIA, FINANCIAL DEVICE

CROSS-REFERENCE TO RELATED APPLICATION

This application claims the benefit under 35 U.S.C. §119 of Korean Patent Application No. 10-2014-0081359, filed Jun. 30, 2014, which is hereby incorporated by reference in its entirety.

BACKGROUND

1. Technical Field

The present disclosure relates to an apparatus and a method for recognizing media and a financial device.

2. Related Art

When media are inserted, a financial device recognizes the inserted media to discriminate the denomination and the authenticity thereof. According to the discriminated result, the financial device executes deposit and withdrawal processing on the corresponding media.

Herein, an apparatus for recognizing media applied to the financial device uses a contact image sensor (CIS) to acquire images of the media and analyzes features of the images of the acquired media to identify the corresponding media or discriminate the authenticity of the corresponding media. For example, a check is printed with characters using magnetic ink. In this case, the financial device reads a magnetic ink character (MIC) printed on the check by a magnetic ink character reader (MICR) to recognize the MIC.

However, when foreign objects are attached to the contact image sensor, images acquired by the corresponding sensor have noise like a vertical stripe. In recognizing the MIC printed on the check, the MIC is wrongly recognized as other characters or it is difficult to set the character recognition range, due to the noise.

Further, extra costs are required to remove the foreign objects attached to the image sensor.

BRIEF SUMMARY

The present disclosure has been made to solve the above-mentioned problems occurring in the prior art while advantages achieved by the prior art are maintained intact.

An aspect of the present disclosure provides an apparatus and a method for recognizing media and a financial device capable of implementing precise character recognition by acquiring at least two media images using an image sensor and combining character recognition information recognized from the respective images to recognize the at least one character included in the corresponding media images.

According to an exemplary embodiment of the present disclosure, an apparatus for recognizing media includes: an image sensor configured to emit different first light source and second light source to media including at least one character to acquire a first image and a second image corresponding to each light source; a noise detector configured to detect noise of a region in which the character is included from the first image and the second image; and a controller configured to combine the first image and the second image depending on the detected noise information to recognize the character included in the media.

According to another exemplary embodiment of the present disclosure, a method for recognizing media includes: by an apparatus for recognizing media, emitting different first light source and second light source to media including at least one character to acquire a first image and a second image corresponding to each light source; detecting noise of a region in which the character is included from the first image and the second image; and combining the first image and the second image depending on the detected noise information to recognize the character included in the media.

According to still another exemplary embodiment of the present disclosure, a financial device includes: a customer access module (CAM) device configured to have media inserted thereinto and released therefrom; a bill validator configured to recognize a denomination and authenticity of the inserted media; and a controller configured to process deposit and withdrawal trading using the corresponding medium depending on the recognized result of the bill validator and whether the inserted media is an abnormal medium, wherein the bill validator detects noises of the region in which the characters are included in the first image and the second image acquired by emitting different first light source and second light source from the image sensor to the media including the character and combines the first image with the second image depending on the detected noise information to recognize the character included in the media.

BRIEF DESCRIPTION OF THE DRAWINGS

The above and other objects, features and advantages of the present disclosure will be mom apparent from the following detailed description taken in conjunction with the accompanying drawings.

FIG. 3 is an exemplified diagram illustrating character recognition results depending on a noise detection result by the apparatus for recognizing media according to the exemplary embodiment of the present disclosure;

FIG. 4 is an exemplified diagram referenced for describing an operation of recognizing character according to an apparatus for recognizing media according to a first exemplary embodiment of the present disclosure;

FIGS. 5 and 6 are exemplified diagrams referenced for describing an operation of recognizing character according to an apparatus for recognizing media according to a second exemplary embodiment of the present disclosure;

FIGS. 7 and 8 are exemplified diagrams referenced for describing an operation of recognizing character according to an apparatus for recognizing media according to a third exemplary embodiment of the present disclosure;

DETAILED DESCRIPTION

Figure 1:
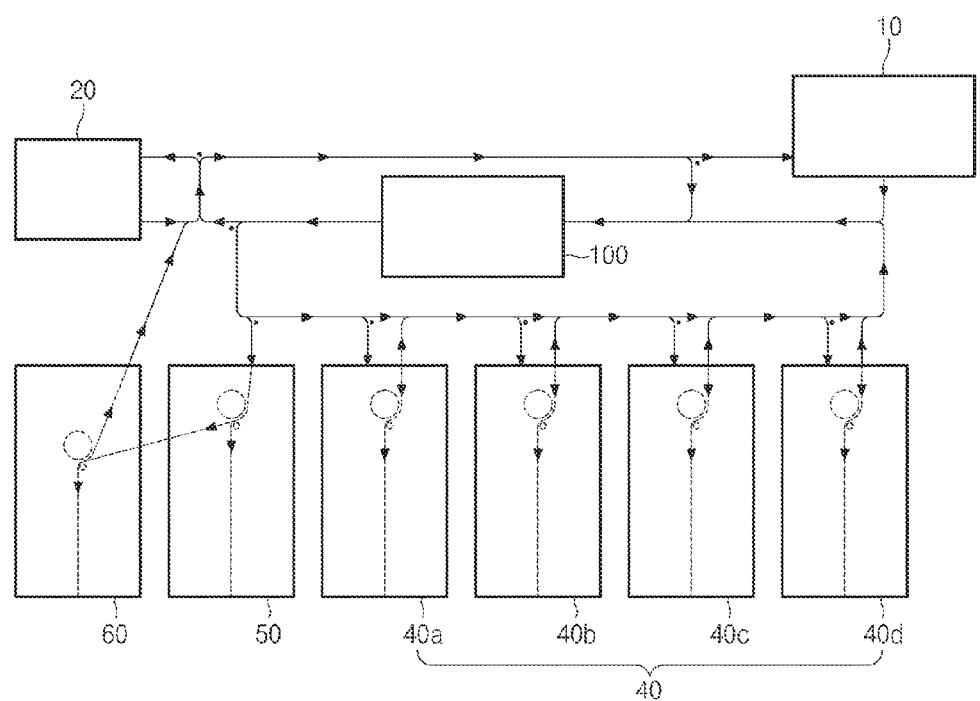
FIG. 1 is a diagram illustrating a configuration of a financial device to which an apparatus for recognizing media according to an exemplary embodiment of the present disclosure is applied.

Hereinafter, some exemplary embodiments in the present specification will be described in detail with reference to the illustrative drawings. It is to be noted that in adding reference numerals to elements of each drawing, like reference numerals refer to like elements even though like elements are shown in different drawings. Further, in describing exemplary embodiments of the present disclosure, well-known functions or constructions will not be described in detail since they may unnecessarily obscure the understanding of the present disclosure.

In addition, in describing components of exemplary components of the present disclosure, terms such as first, second, A, B, (a), (b), etc., can be used. These terms are used only to differentiate the components from other components. Therefore, the nature, times, sequence, etc., of the corresponding components are not limited by these terms. When any components are "connected", "coupled", or "linked" to other components, it is to be noted that the components may be directly connected or linked to other components, but the components may be "connected", "coupled", or "linked" to other components via another component therebetween.

A financial device according to an exemplary embodiment of the present disclosure is a device which receives various media such as a note, securities, a giro, a coin, and a gift certificate to execute medium processing such as processings like deposit processing, giro receipt, and gift certificate exchange, etc., and/or processings like withdrawal processing, a giro release, a gift certificate release, etc., to thereby execute financial businesses. An example of the financial device may include an automated teller machine (ATM) such as a cash dispenser (CD) and a cash recycling device. However, the financial device is not limited to the foregoing example, and therefore may be an apparatus for automating financial businesses like a financial information system (FIS).

Media applied to the present disclosure include notes like a cash, a check, etc., and may include a trading means which is formed of paper like securities, a gift certificate, etc. The media may be printed with information like a serial number, a denomination, etc., for recognizing the corresponding media and a magnetic component for identifying a forgery may be printed in a specific region of the media in a specific pattern.

Further, in describing an operation of recognizing characters from media images, the present disclosure describes recognizing characters, which is marked by characters like Hangeul, alphabetical characters, numbers, special characters, etc., which are included in the media images. Therefore, characters described in the exemplary embodiment of the present disclosure are not limited to any one.

Hereinafter, exemplary embodiments of the present disclosure will be described with reference to the accompanying drawings.

FIG. 1 is a diagram illustrating a configuration of a financial device to which an apparatus for recognizing media according to an exemplary embodiment of the present disclosure is applied.

Referring to FIG. 1, a financial device according to the exemplary embodiment of the present disclosure may include a customer access module (CAM) device 10, a temporary stacker (TSK) 20, a cassette (CST) 40, a recycling cassette (R-CST) 50, a supplementary recycling cassette 60, and a bill validator (BV) 100.

First, the customer access module device 10 is a means for inserting or releasing media like a cash, a check, etc. The customer access module device 10 is provide with a media receiving space accessible by a customer, in which the media receiving space may selectively communicate with the outside by a shutter, etc. Further, the customer access module device 10 may include a pickup means for separating the media from the media receiving space one by one and transferring the media if the customer deposits the media, an integrated means for integrating and releasing the transferred media if a customer withdraws the media, etc.

The temporary stacker 20 temporarily keeps media recognized by the bill validator 100 for a customer to finally confirm the deposit before the media is deposited in storing units 40a to 40d.

The cassette 40 may include a number of storing units 40a to 40d which receives media discriminated by the bill validator 100 depending on a kind of media. In this case, the cassette 40 may keep media in each of the storing units 40a to 40d depending on denominations of media. If a media withdrawing command is input, the storing units 40a to 40d in which the corresponding media are received pick up the received media and provides the picked up media to the customer access module device 10.

The recycling cassette 50 receives the media which are recognized as abnormal media by the bill validator 100. Further, the recycling cassette 50 may also receive media which a customer does not collect, among media withdrawn by a customer's request.

The supplementary recycling cassette 60 keeps media to supplement media which are received in the cassette 40. In this case, the media kept in the supplementary recycling cassette 60 are transferred to the bill validator 100, classified by the bill validator 100 depending on a kind of media, and received in the corresponding cassette 40. In some cases, the supplementary recycling cassette 60 may temporarily receive the media inserted through the customer access module device 10.

The bill validator 100 recognizes the media inserted from the customer to identify the information of the corresponding media and recognize the authenticity of the inserted media. In this configuration, the bill validator 100 may include a contact image sensor (CIS) which acquires images for identifying the media inserted into the bill validator 100. Here, the image sensor may acquire images from a plurality of light sources in one sensor and may acquire images using different of light sources in one sensor. Meanwhile, the image sensor may include at least two sensors acquiring images using different types of light sources. For example, the image sensor may include an infrared image sensor and a visible light image sensor. In this case, if the images are acquired by a plurality of sensors, each sensor may be disposed to be spaced apart from each other. Here, the plurality of sensors may be disposed to be spaced apart from each other on a transfer path of the inserted media to sequentially acquire images.

The bill validator 100 detects and removes noise from media images acquired from at least two light sources, respectively and combines the images from which noise is removed to recognize shape information included in the corresponding media images. In this case, the bill validator 100 may set a region in which at least one character is included as the region of interest, in the media to acquire data from the region of interest and recognize the shape information based on the acquired data. Here, the region of interest may be some region or the entire region of the media images acquired by the image sensor. Further, the region of interest may include only character printed on the media and may also include the character printed on the media and a background of the media. Further, the region of interest may be previously set based on a standard of the media and may also be set as a region in which character is recognized from the medium images after the medium images are acquired.

In this case, the shape information may be single character and patterns included in the media.

Meanwhile, the media recognized as the abnormal media by the bill validator 100 may again return to a customer through the customer access module device 10.

Figure 2:
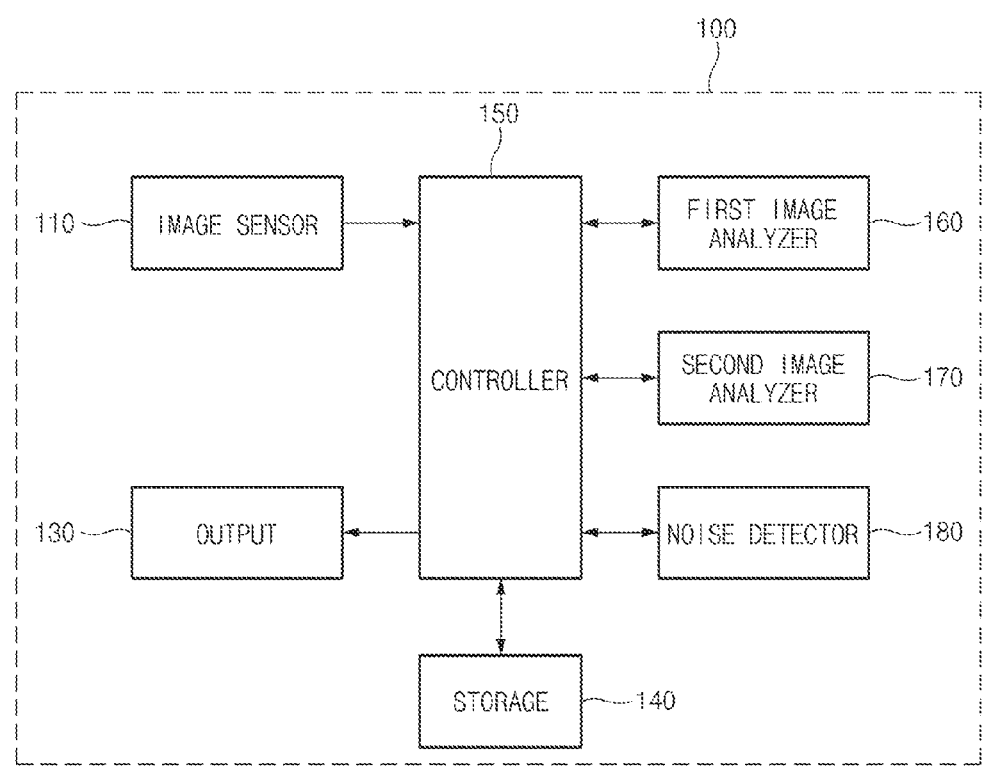
FIG. 2 is a block diagram illustrating a configuration of the apparatus for recognizing media according to the exemplary embodiment of the present disclosure.

The bill validator 100 may correspond to the apparatus for recognizing media illustrated in FIG. 2. Thus, the bill validator and the apparatus may be explained by the same symbol 100 in the exemplary embodiment of the present disclosure. A configuration of the apparatus for recognizing media according to the exemplary embodiment of the present disclosure will be described in detail with reference to FIG. 2.

FIG. 2 is a diagram illustrating the apparatus for recognizing media according to the exemplary embodiment of the present disclosure. Referring to FIG. 2, the apparatus 100 for recognizing media may include the image sensor, an output 130, a storage 140, a controller 150, a first image analyzer 160, a second image analyzer 170, and a noise detector 180. In this configuration, the controller 150 may control an operation of each unit of the apparatus 100 for recognizing media.

The image sensor may be the contact image sensor (CIS). The image sensor may emit light to media using a predetermined light source and acquire the medium image for the corresponding medium by a method of receiving light reflected from the corresponding medium.

Here, the image sensor may include at least two sensors acquiring the media images using different types of light sources. The different types of light sources have at least one of an irradiation angle, a waveform, transmitted light, reflected light, and a disposed position which are different from each other. For example, if a first light source is infrared rays and a second light source is visible light, the apparatus for recognizing media may include a first sensor 110 acquiring the media images using an infrared type and a second sensor 120 acquiring the media images using a visible light type.

Here, the infrared images using the infrared type will be described as a first image below and the visible light image acquired using the visible light type will be described as a second image below. In this case, as different types of light sources, a light source having different quantities of light among light sources of white light, red light, blue light, green light, infrared rays, reflected light, transmitted light, etc., in addition to ultraviolet rays and visible rays may be applied. In the case of using different types light sources, noises detected by characteristics of different light sources may be different. For example, in the case of recognizing at least one character included in media from the first image acquired using the infrared rays, the first image may not have a background or red-based pollution other than character, but the second image acquired using the visible light may have a background or red-based pollution other than character. In this case, the background or the pollution appearing in the second image may be recognized as noise. Further, in the case of using the plurality of image sensor, the plurality of image sensors disposed to be spaced apart from each other may acquire images from different angles. In this case, the plurality of image sensors may be disposed on a transfer path to sequentially acquire images. In this case, the noise included in the media or the noise occurring at the time of the transferring of the media may differently appear in each image.

Meanwhile, the image sensor may acquire the plurality of media images from each light source by using different types of light sources in one sensor and may also acquire the plurality of images from each light source by using the plurality of light sources. However, the following description will be described based on the embodiment in which one or the plurality of image sensors acquire images from different light sources.

The first image and the second image acquired by the image sensor are acquired using different types of light sources and therefore data acquired from each image may be different even though the regions in which the images are detected are same. For example, in the first image and the second image, brightness of the detected region, detected foreign objects or noises, etc., may be different. Therefore the noise which is not detected from the first image may be detected from the second image, but the noise which is not detected from the second image may be detected from the first image.

Therefore, to solve the problem in that character is wrongly recognized or are non-recognized due to the noise in recognizing the character from the media images, the apparatus for recognizing media according to the exemplary embodiment of the present disclosure combines the information from at least two images acquired using different types of light sources to recognize character. In this case, the character recognition rate from the media images may be increased.

The first image and the second image of the media acquired using different types of light sources may be transferred to the controller 150. In this case, the controller 150 may provide the first image and the second image of the media transferred from the first sensor 110 and the second sensor 120 to the image analyzer to process the first image and the second image. For example, the controller 150 may provide the first image to the first image analyzer 160 to process the first image of the media transferred from the first sensor 110. The controller 150 may provide the second image to the second image analyzer 170 to process the second image of the media transferred from the second sensor 120. Further, the controller 150 may provide the data acquired from the first image and the second image, respectively, to the noise detector 180 to detect the noise present in the data acquired from the first image and the second image.

Therefore, the controller 150 may recognize the media information included in the first image and the second image of the corresponding media based on the data acquired from the first image and the second image of the media.

In this case, the media information included in the media image may include at least one of the character and pattern information and the controller 150 may recognize a kind of media, an amount, etc., based on the acquired media information.

The output 130 outputs the media recognition results recognized by the controller 150. As illustrated in FIG. 1, if the apparatus 100 for recognizing media is implemented in the financial device, the output 130 may transfer the media recognition results output by the controller 150 to internal units of the financial device.

The storage 140 may store a setting value for operating the apparatus 100 for recognizing media. In other words, the storage 140 may store setting values for operating the first sensor 110 and the second sensor 120 and may store an algorithm for identifying media or detecting noise of the data acquired from the media images. Further, the storage 140 may store feature information which allows the apparatus 100 for recognizing media to identify each medium or discriminate the authenticity of the media. The information stored in the storage 140 may be called by each unit of the apparatus 100 for recognizing media to be used.

The controller 150 transfers the first image and the second image of the media, respectively, to the first image analyzer 160 and the second image analyzer 170. In this case, the first image analyzer 160 provides the data acquired from the first image to the controller 150. Further, the second image analyzer 170 provides the data acquired from the second image to the controller 150. Therefore, the controller 150 may recognize the media information included in the corresponding media based on at least one of the data of the first image provided from the first image analyzer 160 and the data of the second image provided from the second image analyzer 170. In this case, the controller 150 may recognize the information of the corresponding media like a serial number of the media, etc.

In this case, the controller 150 may provide the first image and the second image to the noise detector 180 to remove the noise included in the data acquired from the images of the corresponding media. In this case, the first image and the second image provided to the noise detector 180 may be an image corresponding to the entire region of the media and may be an image corresponding to some region, for example, a region in which character is included or a region of interest in which a magnetic ink character (MIC) is included.

The noise detector 180 detects noises from the first image and the second image, respectively, which are provided from the controller 150. For example, the noise detector 180 may detect the noise formed in a predetermined direction while the first image and the second image of the media inserted into the apparatus 100 for recognizing media are acquired. Herein, the noise formed in the predetermined direction may be noise of a linear component formed in at least one of a horizontal direction, a vertical direction, and a diagonal direction, for example. In this case, the noise detector 180 may detect the brightness value from the image data to detect noise from a region in which the brightness value is equal to or less than a preset threshold.

Further, the noise detector 180 may extract information on a position where the noise is detected and provide the extracted position information to the controller 150. Here, the noise detector 180 may remove the noise detected from each of the first image and the second image from each image and provide the information on the image from which the noise is removed to the controller 150. According to the exemplary embodiment of the present disclosure, the noise detector 180 may provide the detected noise information to the controller 150 and the controller 150 may remove the noise from the image based on the noise information detected by the noise detector 180 and then recognize the media information included in the media from the image from which the noise is removed. Further, the noise information detected by the noise detector 180 may also be stored in the storage 140.

Therefore, the controller 150 recognizes the media information from the first image and the second image, respectively, depending on the noise detection results of the first image and the second image of the media. In this case, the controller 150 may combine the media information recognized from the first image and the second image to finally generate the media information recognition results.

For example, if the noise is detected from any one of the first image and the second image, the controller 150 may recognize the media information based on the recognition information of the image from which the noise undetected image. Here, the first image and the second image may include a character string including at least two characters. If detecting noise from each single character included in the character string and detects noise from a single character of any one of the first image and the second image, the controller 150 may recognize the character included in the media based on the single character recognition information of the image in which the noise undetected image. In other words, if the noise is detected in each single character included in the character string of the first image, the corresponding character is recognized from the region of the second image corresponding to the single character in which the noise occurs from the first image. On the other hand, if the noise is detected in each single character included in the character string of the second image, the corresponding character is recognized from the region of the first image corresponding to the single character in which the noise occurs from the second image.

As another example, if the noise is detected from each of the first image and the second image, respectively, the controller 150 discriminates the position where the noise is detected and as the discriminated result, recognizes character. In this case, the controller 150 may segment the region in which the character is included in each image into the plurality of single character regions depending on predetermined criteria and may discriminate the position at which the noise is detected based on each single character.

In other words, if the noises detected from each of the first image and the second image are present on different single character, the controller 150 recognizes the character included in the media based on the data recognized from each single character in which the noise is not detected in each image. Meanwhile, if the noises detected from each of the first image and the second image are each present on the same single character, the controller 150 determines whether the positions of each of the noises present on the same single character match with each other. If it is determined that the positions of each of the noises present on the same single character do not match with each other, the corresponding character is recognized by combining images, from which the noises are excluded, in each single character in which the noises are present. In this case, the controller 150 may be combined by segmenting each single character into a plurality of images.

On the other hand, if the positions of each noise present on the same single character in the first image and the second image match with each other, the controller 150 recognizes the same single character as an irrecognizable character to prevent the corresponding character from being wrongly recognized.

Therefore, the controller 150 may generate the media recognition results, including the character recognition results and output the media recognition result through the output 130. For example, the media recognition results output from the output 130 may be used to process the media which is traded through the financial device.

FIG. 3 is an exemplified diagram illustrating the character recognition results depending on the noise detection result by the apparatus for recognizing media according to the exemplary embodiment of the present disclosure, in which the character recognition results in which the images acquired by the first sensor and the second sensor are combined are illustrated.

Referring to FIG. 3, as in (a), if the character is normally recognized from the infrared image, that is, the first image and the character is normally recognized the visible light image, that is, from the second image, the apparatus for recognizing media may normally recognize the character (for example, serial number) included in the corresponding media based on the character recognition results of the first image and the second image. In this case, the apparatus for recognizing media defines the entire region or some region of the image acquired from the image sensor as the region of interest and may recognize the character from the defined region of interest. The detailed embodiment thereof will be described in detail with reference to FIG. 4.

Meanwhile, as in (b) of FIG. 3, if the character is normally recognized from the first image and the noise is detected firm the second image, the apparatus for recognizing media may normally recognize the character (for example, serial number) included in the corresponding medium based on the character recognition results of the first image. Detailed embodiments thereof will be described in detail with reference to FIGS. 5 and 6.

Further, as in (c) of FIG. 3, if noise is detected from the first image and character is normally recognized from the second image, the apparatus for recognizing media may normally recognize the character (for example, serial number) included in the corresponding medium based on the character recognition results of the second image. Detailed embodiments thereof will be described in detail with reference to FIGS. 7 and 8.

Meanwhile, as (d) of FIG. 3, if noise is detected from the first image and noise is detected from the second image, the apparatus for recognizing media may normally recognize the character (for example, serial number) included in the corresponding media or the same single character as an irrecognizable character depending on the position at which the noises are generated in the first image and the second image. Detailed embodiments thereof will be described in detail with reference to FIGS. 9 to 11.

FIG. 4 is an exemplified diagram referenced for describing an operation of recognizing character according to an apparatus for recognizing media according to a first exemplary embodiment of the present disclosure.

Referring to FIG. 4, (a) represents the character recognition information recognized from the first image. Since noise is not detected in the first image illustrated in (a) of FIG. 4, the apparatus for recognizing media may normally recognize a character "19649549" included in the first image.

Further, (b) of FIG. 4 represents the character recognition information recognized from the second image. Since noise is not detected in the second image illustrated in (b) of FIG. 4, the apparatus for recognizing media may normally recognize the character "19649549" included in the second image.

Therefore, the apparatus for recognizing media may output the character recognition result including "19649549" like (c) based on the character recognition information recognized in (a) of FIG. 4 and the character recognition information recognized in (b).

FIGS. 5 and 6 are exemplified diagrams referenced for describing an operation of recognizing character according to an apparatus for recognizing media according to a second exemplary embodiment of the present disclosure. Here, FIGS. 4 and 5 illustrate an embodiment in the case in which the noise is detected from the second image of the first image and the second image.

Referring to FIG. 5, (a) represents the character recognition information recognized from the first image. Since noise is not detected in the first image illustrated in (a) of FIG. 4, the apparatus for recognizing media may normally recognize a character "19649549" included in the first image.

Meanwhile, (b) of FIG. 5 represents the character recognition information recognized from the second image. In the second image illustrated in (b) of FIG. 5, a vertical stripe noise 510 is detected in a fifth single character corresponding to "9" and therefore the apparatus for recognizing media may normally recognize "1964×549" from each single character in which the noise is not detected in the second image except for a fifth single character 520 in which noise occurs.

In this case, since the fifth single character is not recognized in (b) of FIG. 5 but the fifth single character is recognized in (a), the apparatus for recognizing media may combine the character recognition information from (a) and (b) to normally recognize the corresponding character and may output "19649549" including the single character 530 in which the noise occurs like (c) as the character recognition result. In this case, the corresponding character may also be recognized based on the character recognition information from (a) without using (b) in which some single character is not recognized.

Further, referring to (a) of FIG. 6, similar to (a) of FIG. 5, since noise is not detected in the first image, the apparatus for recognizing media may normally recognize the character "19649549" included in the first image.

Meanwhile, since a noise 610 is detected in all the single characters in the second image illustrated in (b) of FIG. 6, the apparatus for recognizing media may not recognize any character in the second image.

In this case, since all the characters are not recognized in (b) of FIG. 6 but all the character is normally recognized in (a), the apparatus for recognizing media may normally recognize the corresponding character based on the character recognition information from (a) and output the character recognition result including "19649549" like (c).

Figures 7, 8:
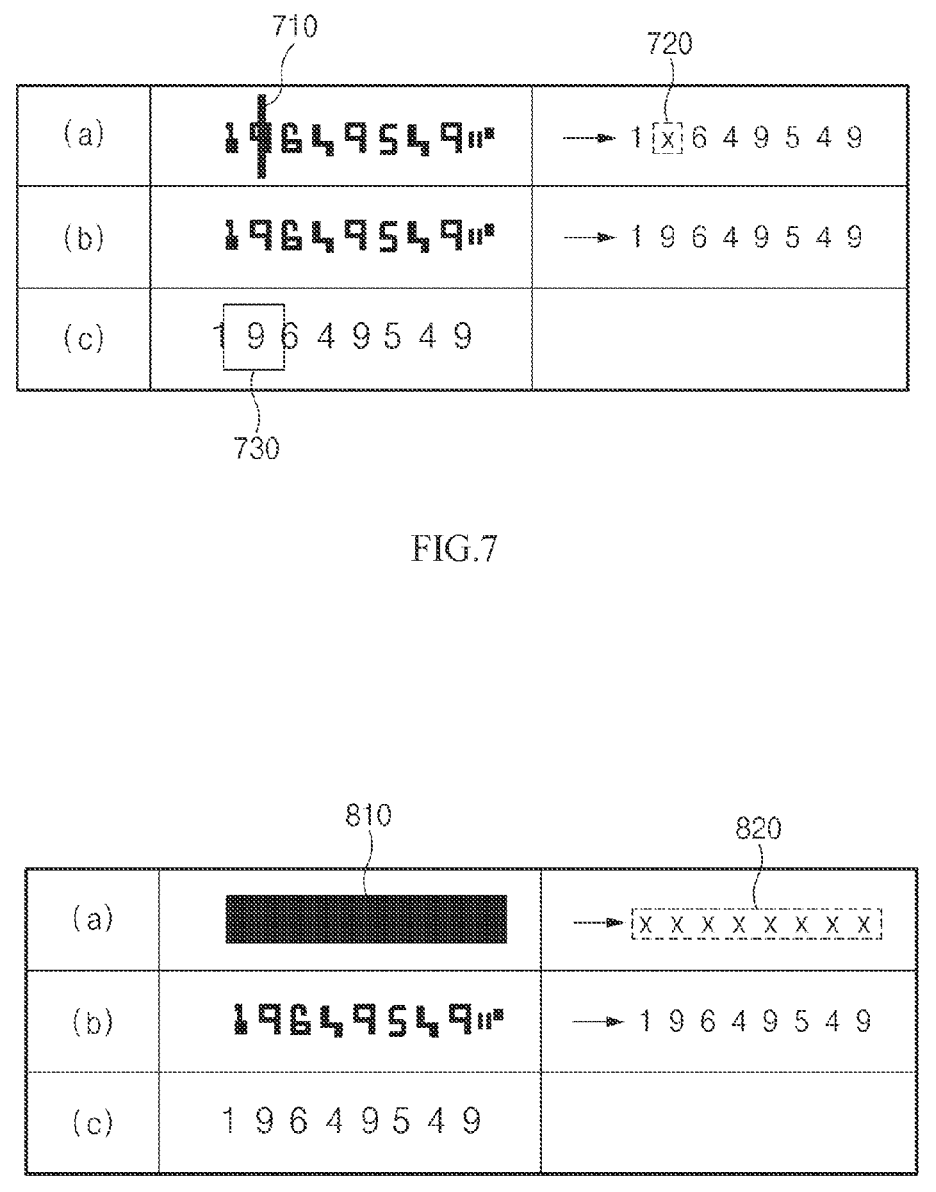

FIGS. 7 and 8 are exemplified diagrams referenced for describing an operation of recognizing character according to an apparatus for recognizing media according to a third exemplary embodiment of the present disclosure. Here, FIGS. 7 and 8 illustrate an embodiment in the case in which the noise is detected from the first image of the first image and the second image.

Referring to FIG. 7, (a) represents the character recognition information recognized from the first image. In the first image illustrated in (a) of FIG. 7, a vertical stripe noise 710 is detected in a second single character corresponding to "9" and therefore the apparatus for recognizing media may normally recognize "1×649549" from each single character in which the noise is not detected in the first image except for a second single character 720 in which noise occurs.

Meanwhile, (b) of FIG. 7 represents the character recognition information recognized from the second image, that is, the visible light image. Since noise is not detected in the second image illustrated in (b) of FIG. 7, the apparatus for recognizing media may normally recognize the character "19649549" included in the second image.

In this case, since the second single character is not recognized in (a) of FIG. 7 but the second single character is recognized in (b), the apparatus for recognizing media may combine the character recognition information from (a) and (b) to normally recognize the corresponding character and may output "19649549" including a single character 730 in which the noise occurs like (c) as the character recognition result.

Further, referring to FIG. 8, since a noise 810 is detected in all the single character in the first image illustrated in (a), the apparatus for recognizing media may not recognize any character in the first image.

Meanwhile, referring to (b) of FIG. 8, similar to (b) of FIG. 7, since noise is not detected in the second image, the apparatus for recognizing media may normally recognize the character "19649549" included in the second image.

In this case, since all the characters are not recognized in (a) of FIG. 8 but all the characters are normally recognized in (b), the apparatus for recognizing media may normally recognize the corresponding character based on the character recognition information from (b) and output the character recognition result including "19649549" like (c).

Figure 9:
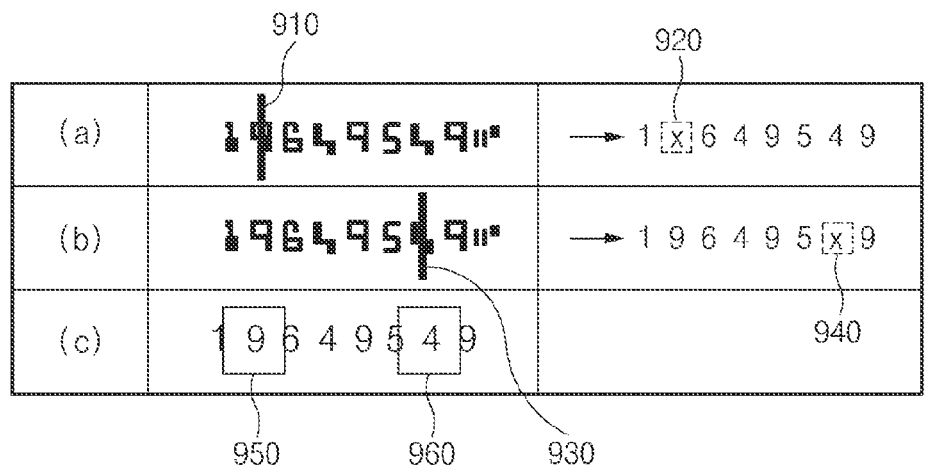
FIGS. 9 to 11 are exemplified diagrams referenced for describing an operation of recognizing character according to an apparatus for recognizing media according to a fourth exemplary embodiment of the present disclosure.
Figure 10:
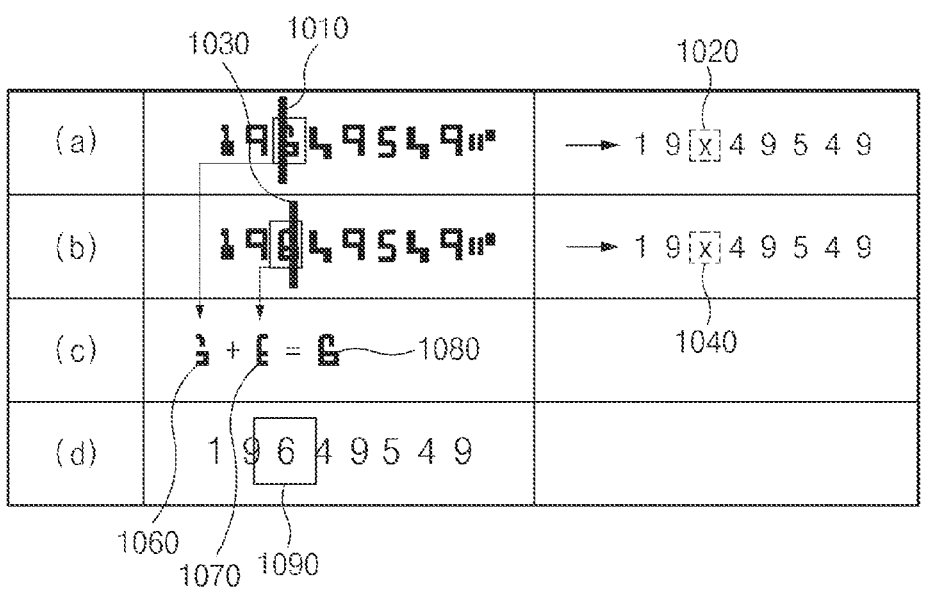
Figure 11:
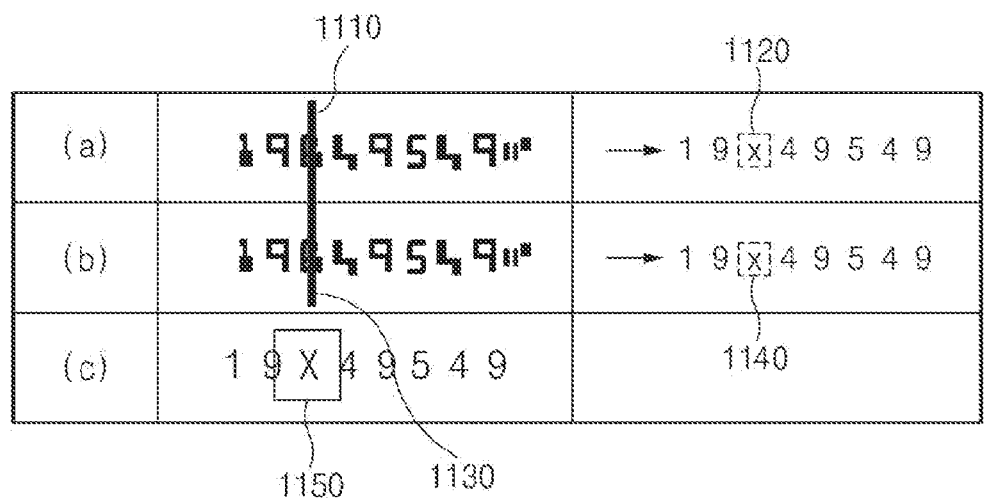

FIGS. 9 to 11 are exemplified diagrams referenced for describing an operation of recognizing character according to an apparatus for recognizing media according to a fourth exemplary embodiment of the present disclosure. Here, FIGS. 9 to 11 illustrate an embodiment in the case in which the noise is detected from each of the first image and the second image, respectively.

Therefore, FIG. 9 illustrates the case in which the noises detected in the first image and the second image are present on different single character.

Referring to FIG. 9, (a) represents the character recognition information recognized from the first image. In the first image illustrated in (a) of FIG. 9, a vertical stripe noise 910 is detected in a second single character corresponding to "9" and therefore the apparatus for recognizing media may normally recognize "1×649549" from each single character in which the noise is not detected in the first image except for a second single character 920 in which noise occurs.

Meanwhile, (b) of FIG. 9 represents the character recognition information recognized from the second image. In the second image illustrated in (b) of FIG. 9, a vertical stripe noise 930 is detected in a seventh single character corresponding to "4" and therefore the apparatus for recognizing media may normally recognize "196495×9" from each single character in which the noise is not detected in the second image except for a seventh single character 940 in which noise occurs.

In this case, according to the apparatus for recognizing media, noise is detected in (a) and (b) of FIG. 9, respectively, but the positions where noise is detected are different in (a) and (b). Therefore, the apparatus for recognizing media may recognize the single character on the other image corresponding to the single character in which the noise is detected in one of the first image and the second image. In other words, since the second single character is not recognized in (a) but the second single character "9" is recognized in (b) and the seventh single character is not recognized in (b) but the seventh single character "4" is recognized in (a), the apparatus for recognizing media may combine the character recognition information from (a) and (b) to normally recognize the corresponding character and may output "19649549" including single characters 950 and 960 in which the noise occurs like (c) as the character recognition result.

Meanwhile, FIG. 10 illustrates the case in which the noises detected in the first image and the second image are each present on the same single character.

Referring to FIG. 10, (a) represents the character recognition information recognized from the first image. In the first image illustrated in (a) of FIG. 10, a vertical stripe noise 1010 is detected in a third single character corresponding to "6" and therefore the apparatus for recognizing media may normally recognize "19×49549" included in the first image except for a third single character 1020 in which noise occurs.

Further, similar to (a, (b) of FIG. 10, a vertical stripe noise 1030 is detected in a third segment corresponding to "6" in the second image and therefore the apparatus for recognizing media may normally recognize "19×49549" included in the second image except for a third single character 1040 in which noise occurs.

In this case, in (a) and (b) of FIG. 10, the noise is detected on the same single character, respectively but the positions of the noise present on the same single character are not completely matched with each other. Therefore, the apparatus for recognizing media may combine an image 1060 from which noise is removed in a third single character of (a) like (c) of FIG. 10 with an image 1070 from which noise is removed in a third single character of (b) to generate one image 1080. Therefore, the apparatus for recognizing media may recognize character from a third single character in which the noise is detected from the image 1080 generated in (c) and output "19649549" including a single character 1090 in which the noise occurs like (d) as the character recognition result.

Meanwhile, similar to FIG. 10, FIG. 11 illustrates the case in which the noises detected in the first image and the second image are present on the same single character.

Referring to (a) of FIG. 11, similar to (a) of FIG. 10, a vertical stripe noise 1110 is detected in a third single character corresponding to "6" in the first image and therefore the apparatus for recognizing media may normally recognize "19×49549" included in the first image except for a third single character 1120 in which noise occurs.

Further, similar to (a), (b) of FIG. 11, a vertical stripe noise 1130 is detected on a third single character corresponding to "6" in the second image and therefore the apparatus for recognizing media may normally recognize "19×49549" included in the second image except for a third single character 1140 in which noise occurs.

In (a) and (b) of FIG. 1, the positions at which each noise is detected on the same single character completely match with each other and therefore the apparatus for recognizing media may no longer recognize the third single character. Therefore, the apparatus for recognizing media may output "19×49549" as the character recognition result or output the information on the non-recognition as a result, except for the single character 1150 in which the noise occurs like (c).

An operation flow of the apparatus for recognizing media according to the exemplary embodiment of the present disclosure configured as described above will be described below in detail.

Figure 12:
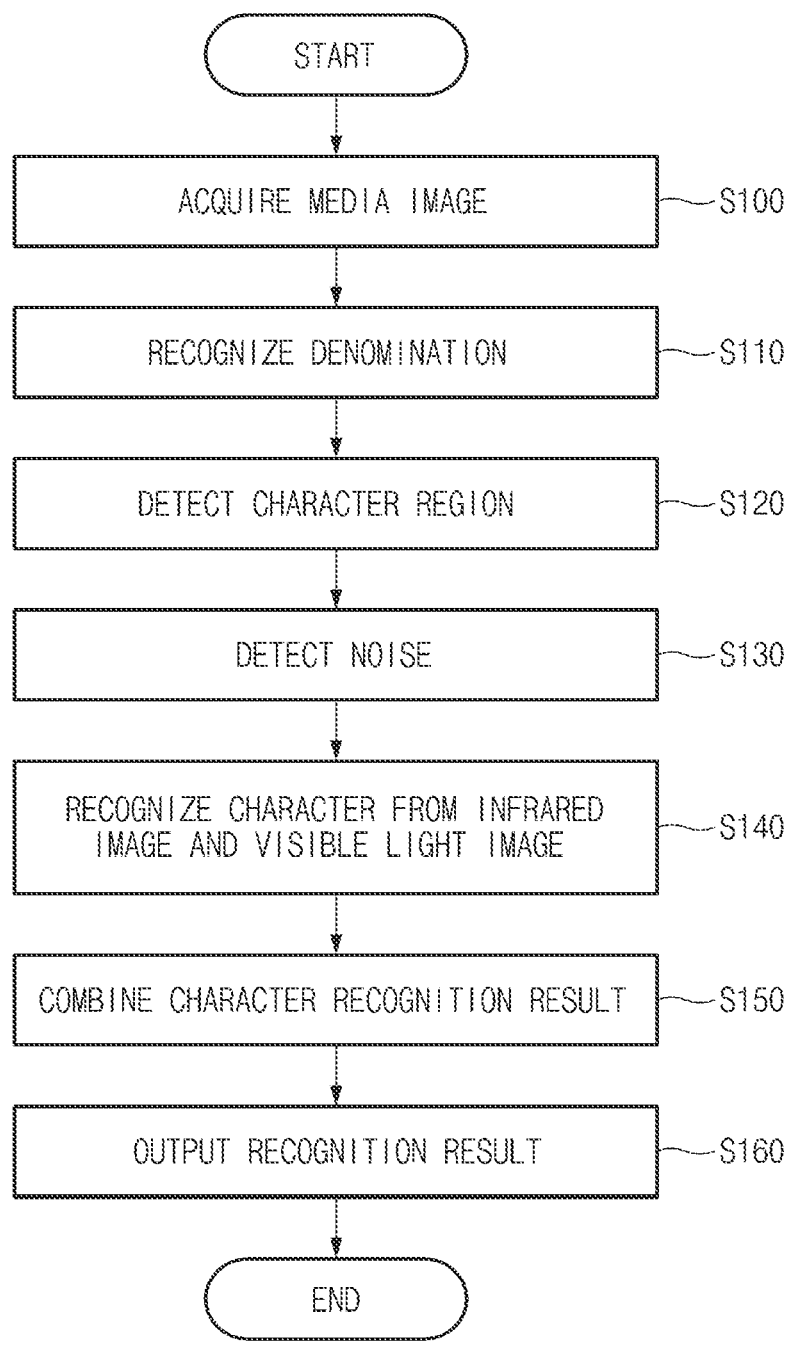
FIG. 12 is a flow chart illustrating an operation flow of a method for recognizing media according to an exemplary embodiment of the present disclosure.

FIG. 12 is a flow chart illustrating an operation flow of a method for recognizing media according to an exemplary embodiment of the present disclosure.

Referring to FIG. 12, if the apparatus for recognizing media acquires the media images including at least one character from different first light source and second light source (S100), the apparatus for recognizing media analyzes an image acquired in the process 'S100' to recognize the denomination of the corresponding media (S110).

The apparatus for recognizing media detects an image for the region in which the character is included or the region of interest in which the magnetic ink character (MIC) is included (S120), in the corresponding media. In this case, the noise is detected from the image detected in the process 's120' (S130). In the process 'S130', the apparatus for recognizing media detects noises from the infrared image acquired from the first light source and the visible light image acquired from the second light source, respectively. Further, the apparatus for recognizing media may remove the noise detected in the process 'S130'.

Next, the apparatus for recognizing media recognizes character from the infrared image and the visible light image, respectively, based on the noise information detected in the process 'S130' (S140) and combines the character recognition result in the process 'S140' (S150) to finally output the character recognition results for the corresponding media (S160).

In the case in which the image is acquired from the same image sensor, if the noise is repeatedly detected at the same position of at least two images, if it is determined that the specific portion of the corresponding image sensor is polluted by foreign objects or some of the image sensors fails to acquire data, the data acquired at the specific portion of the image sensor may be processed as noise in advance. In this case, if the plurality of image sensors are used, the data corresponding to the position at which the noise is processed in advance are combined with data of other image sensors to recognize the character based on the combined images.

In the processes 'S150' and 'S160', the operation of recognizing character from the infrared image and the visible light image will refer to the description of the embodiments of FIGS. 4 to 11.

Meanwhile, all the components configuring the exemplary embodiment of the present disclosure are described as coupled in one or operated, being coupled with each other, but the present disclosure is not necessarily limited to the exemplary embodiments. That is, all the components may be operated, being optionally coupled with one or more within the scope of the present disclosure. Further, all the components may be each implemented in one independent hardware, but a part or all of each component may be selectively combined to be implemented as a computer program having a program module performing some functions or all the functions combined in one or a plurality of hardwares. Codes and code segments configuring the computer program may be easily inferred by those skilled in the art. The computer program is stored in computer readable media and is read and run by a computer and thus the exemplary embodiment of the present disclosure may be implemented. An example of the storage media of the computer program may include a magnetic recording medium, an optical recording medium, a carrier wave medium, and the like.

Further, unless particularly described to the contrary, the term "comprise", "configure", "have", or the like which are described herein will be understood to imply the inclusion of the stated components, and therefore should be construed as including other components, not the exclusion of any other elements. It is to be understood that all the terms including technical and scientific terms has the same meaning as those that are understood by those who skilled in the art, unless particularly described to the contrary. Generally used terms such as terms defined in a dictionary should be interpreted as the same meanings as meanings within a context of the related art and should not be interpreted as ideally or excessively formal meanings unless clearly defined in the present specification.

According to the exemplary embodiments of the present disclosure, it is possible to increase the character recognition rate by acquiring at least two media images using the image sensor and combining the character recognition information recognized from the respective images to recognize the character included in the corresponding media images.

Further, according to the exemplary embodiments of the present disclosure, it is possible to recognize the character depending on the occurrence position of noise even if the noise detected from the media images acquired by the image sensor occurs on the same single character.

The spirit of the present disclosure has been just exemplified. It will be appreciated by those skilled in the art that various modifications and alterations can be made without departing from the essential characteristics of the present disclosure. Accordingly, the embodiments disclosed in the present disclosure and the accompanying drawings are used not to limit but to describe the spirit of the present disclosure. The scope of the present disclosure is not limited only to the embodiments and the accompanying drawings. The protection scope of the present disclosure must be analyzed by the appended claims and it should be analyzed that all spirits within a scope equivalent thereto are included in the appended claims of the present disclosure.

What is claimed is:

1. An apparatus for recognizing media, comprising:
   an image sensor configured to emit different first light source and second light source to media including at least one character to acquire a first image and a second image corresponding to each light source;
   a noise detector configured to detect noise of a region in which the character is included from the first image and the second image; and
   a controller configured to combine the first image and the second image depending on the detected noise information to recognize the character included in the media;
   wherein the controller recognizes the character included in the media based on character recognition information of a noise undetected image, if the noise is detected from any one of the first image and the second image.

2. The apparatus according to claim 1, wherein the first light source and the second light source have at least one of an irradiation angle, a waveform, a transmitted light, a reflected light, and a disposed position which are different from each other.

3. The apparatus according to claim 1, wherein the first image and the second image include a character string including at least two characters, and
   the controller detects noise in each single character included in the character string from the first image and the second image and recognizes the character included in the media based on single character recognition information of the image in which the noise undetected image if the noise is detected in the single character of any one of the first image and the second image.

4. The apparatus according to claim 1, wherein the controller recognizes the region in which the character is included from the first image and the second image and segments the region in which the character is included into a plurality of single character regions based on pre-determined criteria.

5. The apparatus according to claim 4, wherein the controller discriminates a position at which the noise is detected based on each single character included in the first image and the second image if the noises are detected from each of the first image and the second image, respectively.

6. The apparatus according to claim 4, wherein the controller combines the character recognition information recognized from each single character in which the noises are not detected in the first image and the second image to recognize the character included in the media, if the noises detected from the each of first image and the second image are present on different single characters.

7. The apparatus according to claim 4, wherein the controller determines whether the positions of each noise present on the same single character match each other if the noises detected from each of the first image and the second image are on the same single character.

8. The apparatus according to claim 7, wherein the controller combines images from which the noises are excluded in each single character of the first image and the second image to recognize the character, if the positions of each of the noises present on the same single character do not match each other.

9. The apparatus according to claim 7, wherein the controller recognizes the same single character as an unrecognizable character if the positions of each of the noises present on the same single character match each other.

10. A method for recognizing media, comprising:
by an apparatus for recognizing media,
emitting different first light source and second light source to media including at least one character to acquire a first image and a second image corresponding to each light source;
detecting noise of a region in which the character is included from the first image and the second image; and
combining the first image and the second image depending on the detected noise information to recognize the character included in the media;
wherein combining the first image and the second image is performed by recognizing the character included in the media based on character recognition information of a noise undetected image, if the noise is detected from any one of the first image and the second image.

11. A financial device, comprising:
a customer access module device configured to have media inserted thereinto and released therefrom;
a bill validator configured to recognize a denomination and authenticity of the inserted media; and
a controller configured to process deposit and withdrawal trading using the corresponding medium depending on the recognized result of the bill validator and whether the inserted media is an abnormal medium;
wherein the bill validator detects noises of a region in which characters are included in a first image and a second image acquired by emitting different first light source and second light source from an image sensor to the media including the characters and combines the first image with the second image depending on the detected noise information to recognize the character included in the media;
wherein when the bill validator combines the first image with the second image, the bill validator recognizes the characters included in the media based on character recognition information of a noise undetected image, if the noise is detected from any one of the first image and the second image.

* * * * *